(12) United States Patent
Phare et al.

(10) Patent No.: US 11,281,028 B2
(45) Date of Patent: Mar. 22, 2022

(54) HIGH-EFFICIENCY THERMAL PHASE SHIFTER

(71) Applicant: Voyant Photonics, Inc., Long Island City, NY (US)

(72) Inventors: Christopher T. Phare, Long Island City, NY (US); Steven A. Miller, Long Island City, NY (US); Viraj Shah, Long Island City, NY (US)

(73) Assignee: VOYANT PHOTONICS, INC., New York, NY (US)

( * ) Notice: Subject to any disclaimer, the term of this patent is extended or adjusted under 35 U.S.C. 154(b) by 0 days.

(21) Appl. No.: 16/826,051

(22) Filed: Mar. 20, 2020

(65) Prior Publication Data
US 2020/0363661 A1   Nov. 19, 2020

Related U.S. Application Data

(60) Provisional application No. 62/821,924, filed on Mar. 21, 2019.

(51) Int. Cl.
*G02F 1/01* (2006.01)

(52) U.S. Cl.
CPC ............ *G02F 1/0147* (2013.01); *G02F 1/011* (2013.01); *G02F 2203/50* (2013.01)

(58) Field of Classification Search
CPC .............................. G02F 2203/50; G02F 1/011
See application file for complete search history.

(56) References Cited

U.S. PATENT DOCUMENTS

| | | | | |
|---|---|---|---|---|
| 6,278,168 B1 * | 8/2001 | Day | ..................... | G02F 1/025 |
| | | | | 257/431 |
| 7,627,203 B2 * | 12/2009 | Chen | ..................... | G02F 1/0147 |
| | | | | 385/129 |
| 9,946,099 B2 * | 4/2018 | Gill | ......................... | G02B 6/132 |
| 10,365,507 B2 * | 7/2019 | Ishikura | ................ | G02F 1/0147 |
| 2016/0334648 A1 * | 11/2016 | Lu | ........................ | G02F 1/2257 |
| 2018/0173025 A1 * | 6/2018 | McGreer | ............... | G02F 1/2257 |
| 2018/0341126 A1 * | 11/2018 | Ishikura | ................ | G02F 1/0147 |

\* cited by examiner

*Primary Examiner* — Sung H Pak
(74) *Attorney, Agent, or Firm* — Stratford Group Ltd.

(57) ABSTRACT

Disclosed herein are systems and architecture for thermal waveguide-based phase shifters which improve thermal efficiency by having multi-pass waveguides arranged under the heating element in a serpentine fashion, with the waveguides having mismatched propagation constants. The combination allows for an increase in phase shift without increasing the length or the power consumption of the resistive heating element by increasing the total length of waveguide being heated by a singular heating element.

19 Claims, 16 Drawing Sheets

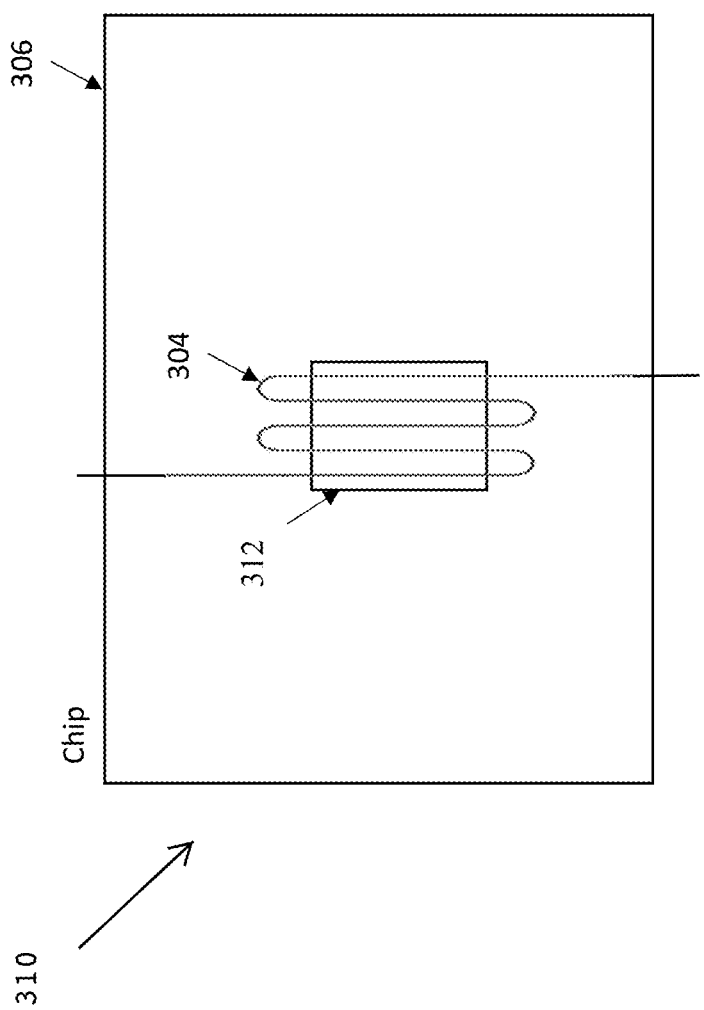

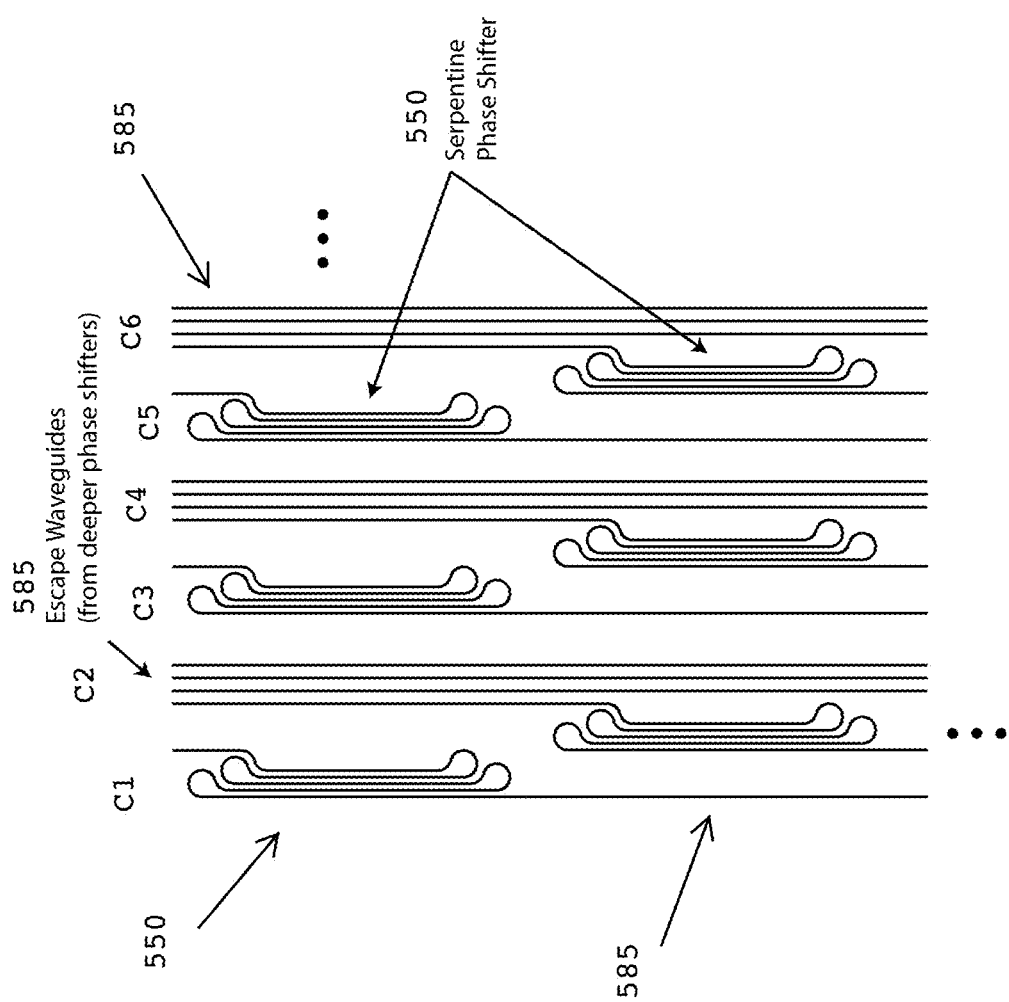

HIGH-EFFICIENCY THERMAL PHASE SHIFTER

CROSS-REFERENCE TO RELATED APPLICATION

This application claims the benefit of U.S. Provisional Application No. 62/821,924, filed Mar. 21, 2019, which is hereby incorporated by reference in its entirety.

STATEMENT REGARDING FEDERALLY SPONSORED RESEARCH OR DEVELOPMENT

This application was made with government support under FA8650-19-C-7919 awarded by the Defense Advanced Research Projects Agency (DARPA). The federal government has certain rights in the invention.

TECHNICAL FIELD

The present disclosure relates to thermal waveguide-based phase shifters used in the field of integrated photonics, and in particular to phase shifters, which may serve as tuning elements, the active core of switches and modulators, and the crucial elements of optical phased arrays.

BACKGROUND

Phase shifters are often used to shift the phase of light propagating through a waveguide. A thermal phase shifter, also referred to as a thermo-optic phase shifter, may be used to shift the phase of light in a waveguide by heating the waveguide, thereby changing the refractive index of the waveguide in a heated area via the thermo-optic effect. Any light propagating through the heated area with the slightly-changed index value travels at a different phase velocity, creating a net phase shift after some propagation length. In this manner, thermal phase shifters may be used to control switching, attenuation, or modulation of an optical signal.

However, thermal phase shifters often have low thermal efficiency due to high power consumption associated with the heating element and high heat dissipation into the material surrounding the waveguide. Since a typical application of integrated photonics, e.g., data centers and advanced computing systems, may utilize numerous thermal phase shifters, this low thermal efficiency can severely impact device reliability and necessitates large-scale thermal management.

An object of the present invention is to overcome the shortcomings of the prior art by providing a more efficient phase shifter.

SUMMARY OF THE INVENTION

Accordingly, the present invention relates to a phase shifter comprising:
a substrate; a cladding layer over the substrate; a waveguide within the cladding layer comprising a plurality of parallel waveguide sections adjacent each other, and a plurality of waveguide bend sections connecting the plurality of parallel waveguide sections; and a heater for heating the waveguide, thereby changing the index of refraction thereof;
wherein adjacent parallel waveguide sections each comprise a different propagation constant, to increase a wavevector mismatch between immediately adjacent straight parallel waveguide sections to decrease coupling therebetween.

BRIEF DESCRIPTION OF THE DRAWINGS

The invention will be described in greater detail with reference to the accompanying drawings which represent preferred embodiments thereof, wherein:

FIG. 3A is a top view of a multi-pass waveguide phase shifter, in accordance with embodiments of the present disclosure.

FIG. 6A is a top view of a two-dimensional array layout with escape waveguides, in accordance with embodiments of the present disclosure.

DETAILED DESCRIPTION

Figure 1A:
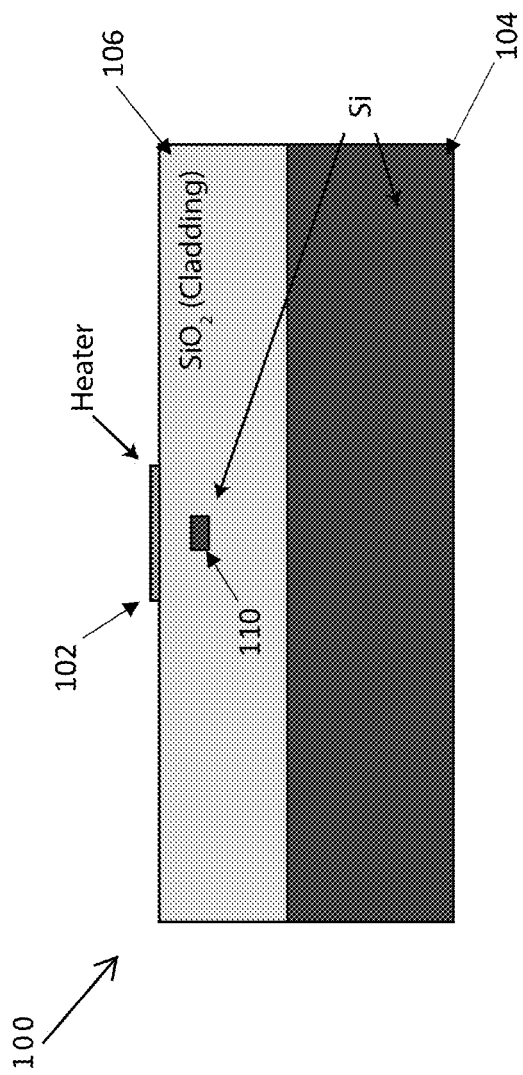
FIG. 1A is a vertical cross-sectional view of a conventional single waveguide phase shifter, in accordance with embodiments of the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art.

Thermal phase shifters, also referred to as thermo-optic phase shifters, often have low thermal efficiency. One reason is due to high power consumption associated with the heating element. Another reason is that the waveguide is separated from the heating element by additional material, e.g., cladding, such that heat from the heating element must first pass through the cladding before it reaches the waveguide. Furthermore, heat also spreads laterally, both through the cladding and the waveguide. Accordingly, there is a high degree of heat dissipation into the material surrounding the waveguide.

The embodiments of thermal phase shifters disclosed herein seek to address this issue by placing additional waveguides under the heating element, e.g., within the heated area between the heating element and the main waveguide. The waveguides may be arranged in a serpentine fashion, thereby increasing the total length of waveguide being heated by a singular heating element. By routing the light in this manner, such that it makes several passes under the same heating element, it is possible to salvage some of the heat that is otherwise wasted. This results in an increase in phase shift, associated with the increase in the heated length of waveguide, without increasing the length or the power consumption of the resistive heating element.

However, there are constraints associated with placing additional waveguide length under the heating element, e.g. in a serpentine arrangement. Typically, waveguides must be spaced several microns apart to eliminate optical leakage between adjacent waveguides. This typically-required spacing of several microns means that waveguides away from the center of the heating element have significantly less temperature change than any waveguides at the center of the heating element, limiting the number of passes under the heater and the ultimate efficiency gain of the technique.

Although thermal phase shifter configurations using a serpentine arrangement of waveguides have been proposed before, they do not address these constraints that limit the efficiency gain of the technique. For instance, some systems have proposed waveguides that are arranged in a serpentine fashion in order to increase efficiency and minimize power consumption. However, such waveguides all use the same cross sections, e.g. they are of the same width, which limits the number of passes under the heater.

The embodiments of thermal phase shifters disclosed herein seek to address this issue by deliberately mismatching the k-vectors, i.e. propagation constants, of each pass of the serpentine waveguides, letting them be placed much closer together while minimizing the coupling between them. As described in Saleh, B. E. A. & Teich, M. C. Fundamentals of Photonics. (John Wiley & Sons, 2007), the maximum power coupling between two waveguides varies as $1/((\Delta\beta/2\kappa)^2+1)$, where $\Delta\beta$ is the difference in propagation constant and $\kappa$ is the field overlap coupling strength. This engineered phase velocity mismatch allows weak coupling between waveguides even when their evanescent fields overlap. The propagation constant can be modified using any physical dimension, or the index of the waveguide material itself, e.g., change the waveguide material for each waveguide, but it is usually easiest to change the width of each waveguide. Thus, varying the widths of the serpentine waveguides is one approach that enables waveguides to be placed closer together under the heating element.

Accordingly, the embodiments of thermal phase shifters disclosed herein seek to combine the concept of serpentine waveguides with the concept of mismatched propagation constants in order to place waveguides closer together and concentrate them under the center of the heating element, such that more of the heat generated by the heating element can be captured for use in shifting the phase of the light passing through the waveguides. Additional considerations and variations in implementation are disclosed below.

Figure 1B:
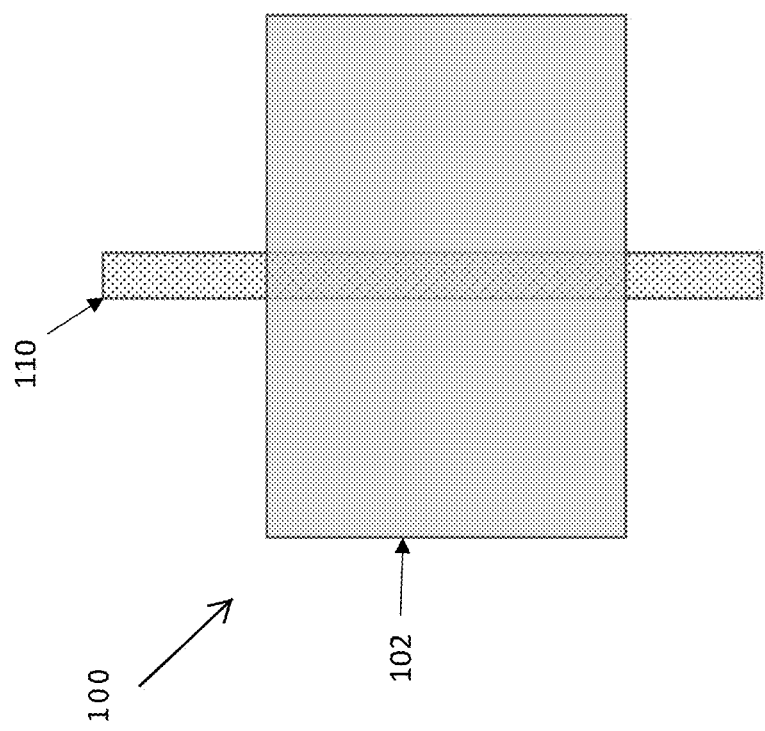
FIG. 1B is a top view of the single waveguide phase shifter of FIG. 1A.

With reference to FIG. 1A, a conventional phase shifter 100, may include a substrate 104, which may be comprised of silicon or other suitable material. Adjacent to the substrate 104 may be an layer of cladding 106, e.g. an upper layer portion and a lower layer portion, which may be comprised of a dielectric material, such as silicon dioxide. A heating element 102, also referred to as a heater, may be positioned on the upper layer of the cladding 106. The heating element 102 may be any suitable device or material configured to generate heat. In some embodiments, the heating element 102 comprises a resistor, such as a metal or semiconducting wire that heats up when current is passed through it. There may be a waveguide 110 formed in a device or waveguide layer positioned between the upper and lower layers of the cladding 106, directly below the heating element 102. As depicted in FIG. 1A, the waveguide 110 extends parallel to the substrate 104, with the orientation of the waveguide 110 parallel to the heating element 102, shown in the top view of FIG. 1B. Accordingly, heat from the heating element 102 spreads downward through the upper layer of the cladding 106 and into the waveguide 110. Heat also spreads laterally, both in the cladding 106 and the underlying substrate 104. The distribution of heat at the waveguide layer falls off over several microns as the distance from the heating element 102 and the waveguide 110 increases. This property is shown and discussed in further detail with regards to FIG. 2.

Figure 2:
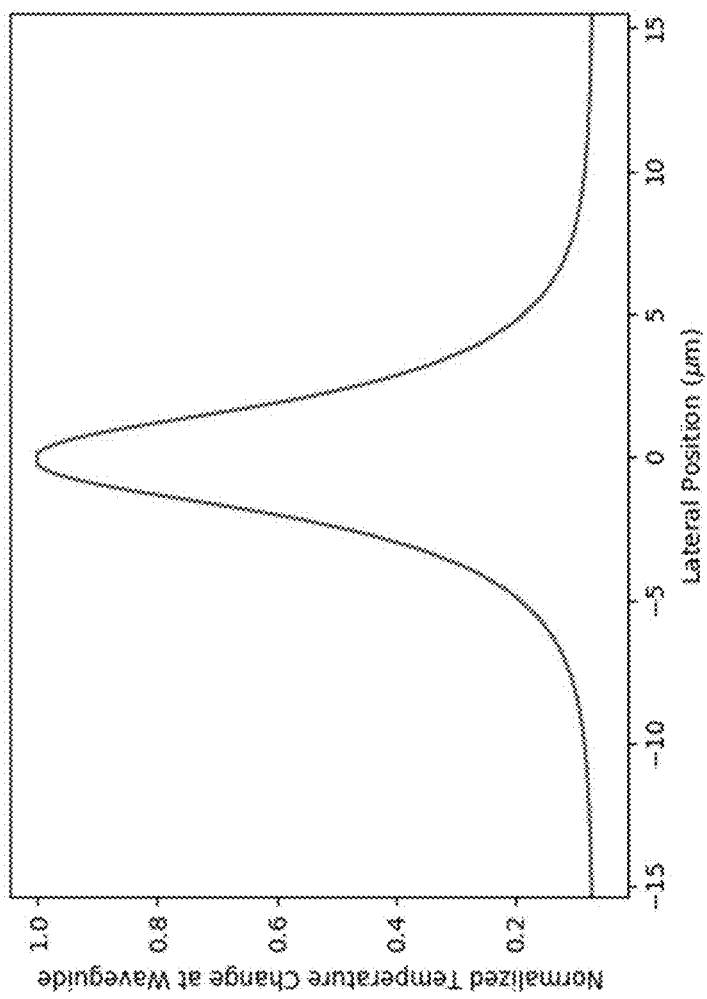
FIG. 2 is a graph illustrating simulated thermal distribution and falloff in terms of normalized temperature change for unit current through the heater at the waveguide layer, such as in the thermal phase shifter arrangement shown in FIG. 1A.

FIG. 2 is a graph that illustrates simulated thermal distribution and falloff in terms of normalized temperature change for unit current through the heater at the waveguide layer, such as in the thermal phase shifter 100 shown in FIG. 1A. The X-axis represents the lateral position or displacement relative to the center of the heating element 102. The scale spans from a position −15 micrometers, e.g. 15 micrometers left of the center of the heating element 102, to a position of 15 micrometers, e.g. 15 micrometers right of the center of the heating element 102, with a position of zero being directly under the center of the heating element 102. The Y-axis represents the normalized temperature change at the waveguide 110. Since the scale is normalized, it spans from zero to one. Thus, the graph illustrates the relative temperature change at the waveguide 110 based on the lateral distance from the center of the heating element 102.

From the graph in FIG. 2, it can be seen that the generated temperature change in the waveguide 110 due to the heating element 102 is very localized and falls off on the order of a few microns. Once you move out 5 micrometers in either direction from the center of the heating element 102, the temperature change in the waveguide 110 quickly drops. Thus, most of the temperature change in the waveguide 110 is mostly concentrated in the portion of the waveguide 110 that is directly below the center of the heating element 102.

With reference to FIGS. 3A-3D, it should be noted that FIGS. 3A-3D illustrate two general ways of implementing a multi-pass waveguide scheme, assuming that only the straight portions, and not the bends, of the waveguides are underneath the heating element. Thus, the bends in the waveguides are visible in FIG. 3A to provide context, but they are not shown in FIGS. 3B-3D or described in any detail. However, there are numerous ways to implement the bends that route together the waveguides, and those are discussed in further detail in regard to FIGS. 5A-5C.

FIG. 3A is included to provide context for a multi-pass waveguide phase shifter 310 integrated in a photonic integrated circuit (PIC) chip 306. In the figure, a portion of the serpentine waveguide 304 runs under the heating element 312 as part of the chip 306 used in an integrated photonics application.

Figure 3B:
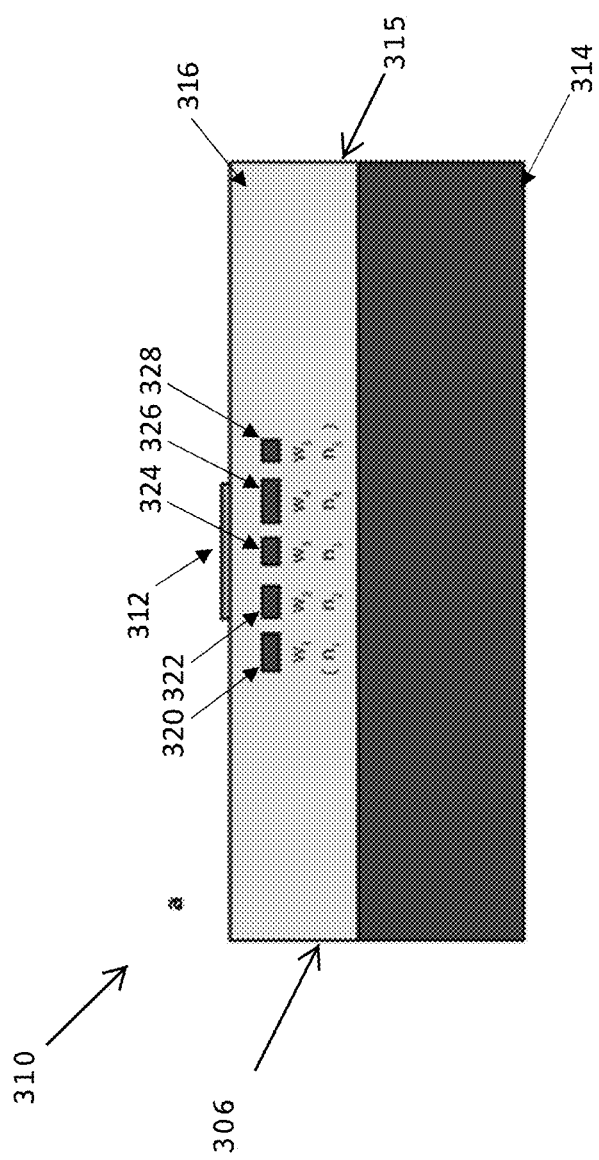
FIG. 3B is a vertical cross-sectional view of a multi-pass waveguide phase shifter, in accordance with embodiments of the present disclosure.
Figure 3C:
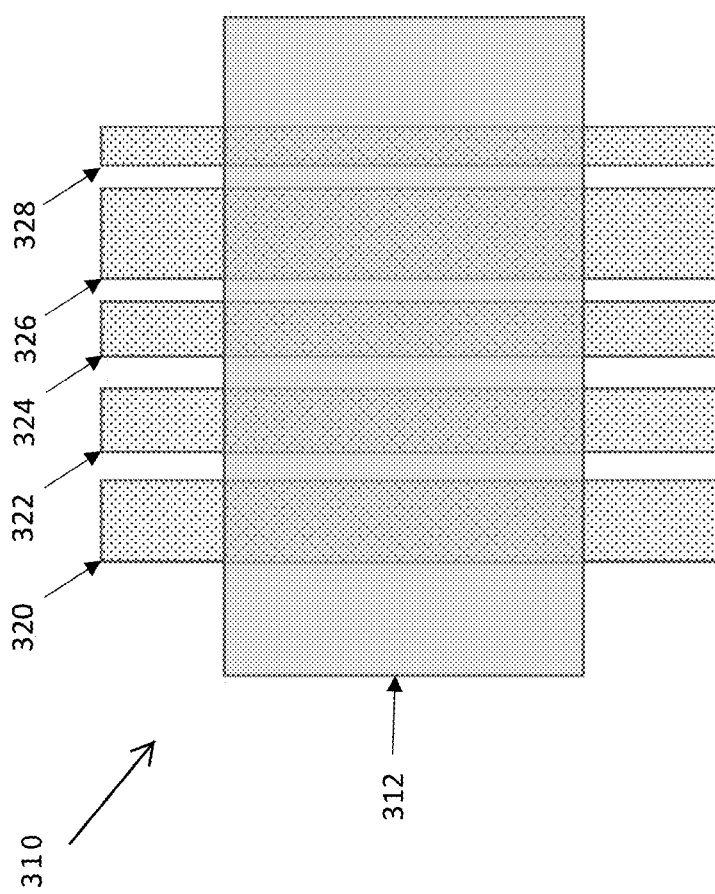
FIG. 3C is a top view of the multi-pass waveguide phase shifter of FIG. 3B.

With reference to FIGS. 3B and 3C, a phase shifter 310 includes a waveguide 304 comprised of waveguides sections 320, 322, 324, 326, and 328, which may be straight and parallel to each other, are routed under the heater 312 in a serpentine fashion, with each of the waveguide sections 320, 322, 324, 326, and 328 including different widths or at least adjacent waveguide sections 320, 322, 324, 326, and 328 or at least waveguides spaced within twice the pitch away, including different widths, so that the waveguide sections 320, 322, 324, 326, and 328 have weak coupling with each other, and therefore may be placed closer together under the heating element 312. Similar to the embodiment shown in FIG. 1A, the phase shifter 310 of FIG. 3B comprises a substrate 314, e.g. silicon, adjacent to a cladding layer 315, e.g. silicon dioxide, which may be comprised of a lower cladding layer and an upper cladding layer below and above, respectively, the waveguide sections 320, 322, 324, 326, and 328. A heating element 312 may be mounted on top of positioned in the upper cladding layer 316, although other heater arrangements are possible. In the embodiment shown in FIG. 3B, there are five waveguide sections 320, 322, 324, 326, and 328 that run underneath the heating element 312. Each of the waveguide sections 320, 322, 324, 326, and 328 may include a different propagation constant ($n_i$), e.g. a different width ($w_i$), a different thickness, a different doping concentration or a different material refractive index of all or part of the waveguide section, e.g. waveguide sections 320, 322, 324, 326, and 328 or the cladding surrounding, e.g. upper cladding 316, lower cladding 315 or beside, the waveguide section.

For example, in one embodiment, the five waveguide sections 320, 322, 324, 326, and 328 may include a same thickness, e.g. of 220 nm, and different widths, e.g. of 400 nm, 450 nm, 500 nm, 425 nm, and 475 nm, on equal center-to-center pitch, in the five-pass structure, whereby there is also different widths of cladding between each waveguide section 320, 322, 324, 326, and 328. The waveguide sections 320, 322, 324, 326, and 328 may be ordered to maximize the wavevector mismatch between immediately adjacent waveguide sections that would otherwise have the largest coupling. This design limits coupling to a negligible level over the few-hundred micron length of the parallel heater section 312 even for waveguide-to-waveguide pitch below 800 nm. Such a small pitch allows all of the waveguide sections 320, 322, 324, 326, and 328 to be placed underneath the heater 312, far enough inward before significant thermal falloff. It is possible to use any number of parallel waveguide sections, i.e. not just five waveguide sections 320, 322, 324, 326, and 328 as depicted in the figure, and widths may repeat as long as the waveguide sections with matching widths are sufficiently far apart, e.g. 3 or more pitch lengths, to not couple even with matched propagation constants. In some embodiments, the number of waveguide section passes under the heater 312 may be between 3 to 9. In some embodiments, the widths of the waveguide sections may be selected from any value between 250 and 500 nm. Beyond 500 nm, there may be issues with multimode propagation in each individual waveguide. Below 250 nm, there may be issues with the waveguides coupling.

In one embodiment, a method for determining the widths of the waveguide sections, e.g. 320, 322, 324, 326, and 328, used in the phase shifter 310 comprises the following: (1) find all permutations of the widths of the waveguide sections, e.g. 320, 322, 324, 326, and 328, from a selection of widths within a desired range that, preferably, maintains high confinement and single-mode operation, (2) filter out permutations that have a difference in width between nearest neighbors below a threshold value, typically 60 nm, (3) from the remaining permutations, select all that maximize the average width difference between each pair of immediately neighboring waveguides, (4) from the remaining permutations, select all that maximize the average waveguide width, so as to minimize propagation losses, and (5) recursively filter out designs that have a greater variance in the neighboring width difference between the first and second waveguide, then the first and second, and second and third, and so on till one permutation of widths remain. This method is a heuristic and does not necessarily give the optimum design, but it seeks to maximize a number of key parameters. First, it maximizes the mismatch in propagation constant or effective index of refraction between nearest-neighbor waveguide sections, seeking to minimize optical coupling between those waveguide sections. Because propagation constant is roughly linearly proportional to width for the range of widths considered, width is used as a proxy for propagation constant. Second, it minimizes propagation loss by picking the widest waveguide sections possible, minimizing mode interaction with the waveguide sidewall. Third, it minimizes crosstalk between second-neighbors, third-neighbors, and so on by the recursive filtering. For equal center-to-center pitch of 900 nm and 9 waveguides, the algorithm selects a possible set of widths 435, 375, 480, 405, 465, 390, 450, 360, and 420 nm. For 3, 5, or 7 waveguides in the phase shifter 350, a possible configuration is to take the first 3, 5, or 7 widths from this list. For greater than 9 waveguide sections, a possible configuration is to loop through the list in sequence repetitively, e.g. 435, 375, 480, 405, 465, 390, 450, 360, 420, 435, 375, 480, 405, 465, 390, 450, 360, 420, 435, 375, . . . .

Figure 3D:
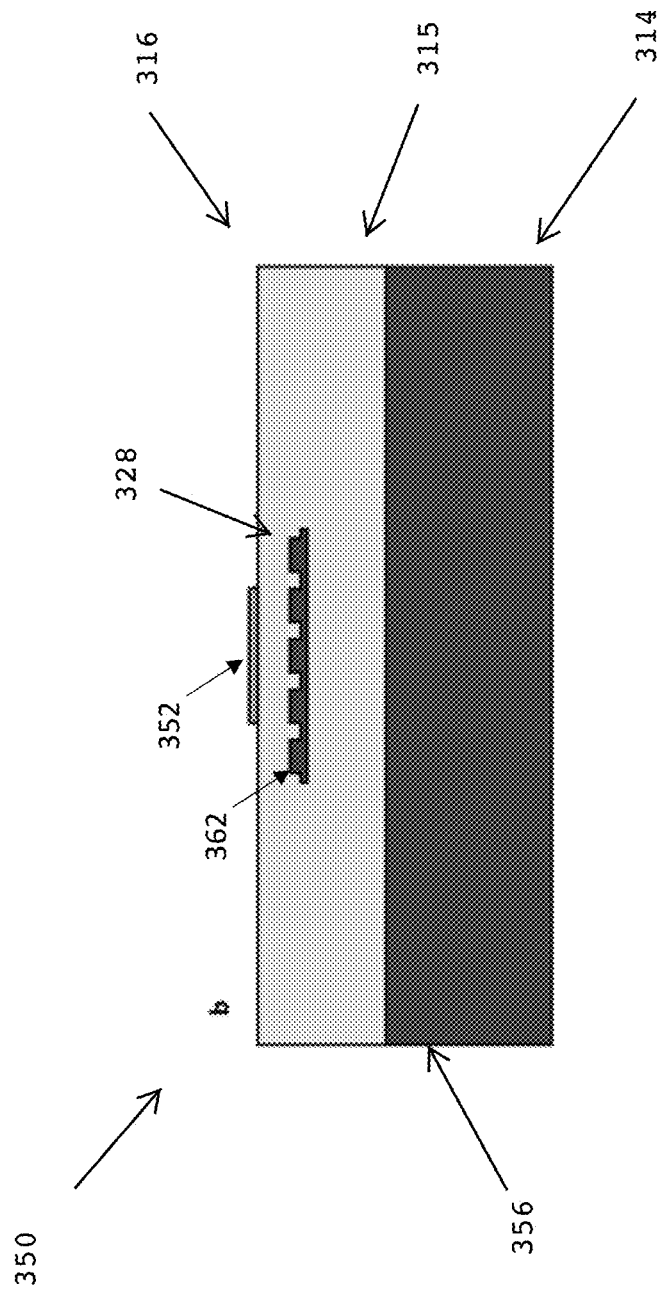
FIG. 3D is a vertical cross-sectional view of a multi-pass waveguide phase shifter, in accordance with embodiments of the present disclosure.

FIG. 3D is a vertical cross-section view of a multi-pass waveguide phase shifter 350, fabricated in a chip 356, in accordance with embodiments of the present disclosure. The difference between the embodiments presented in FIG. 3B and FIG. 3D is that, in the phase shifter 350 shown in FIG. 3D, in addition to having varying propagation constants, e.g. widths, the five waveguide sections 320, 322, 324, 326, and 328 are only partially etched thereby forming a waveguide slab 362, e.g. an electrically conductive material such as silicon, connecting the waveguide sections, e.g. the waveguides 320, 322, 324, 326, and 328 shown in FIG. 3B, and the bends together to improve lateral thermal conductivity. This is represented in FIG. 3D by the waveguide slab 362, which sits under the heating element 352.

Especially when using silicon as the waveguide material, the thermal conductivity of the waveguide slab 362 is much greater than the silicon dioxide cladding, allowing heat to diffuse faster laterally between the waveguide sections, e.g. waveguide sections 320, 322, 324, 326, and 328. This effect increases the temperature of waveguide sections 320, 322, 324, 326, and 328 far from the center by making the falloff with distance less dramatic, which increases the efficiency of the entire phase shifter 350.

In the embodiments of thermal phase shifter 350 disclosed herein, the connecting waveguide slab 362 is a waveguide-to-waveguide connection that improves thermal conductivity between the waveguide sections 320, 322, 324, 326, and 328, with the heater 352 being entirely separate from the connecting waveguide slab 362.

Figure 4:
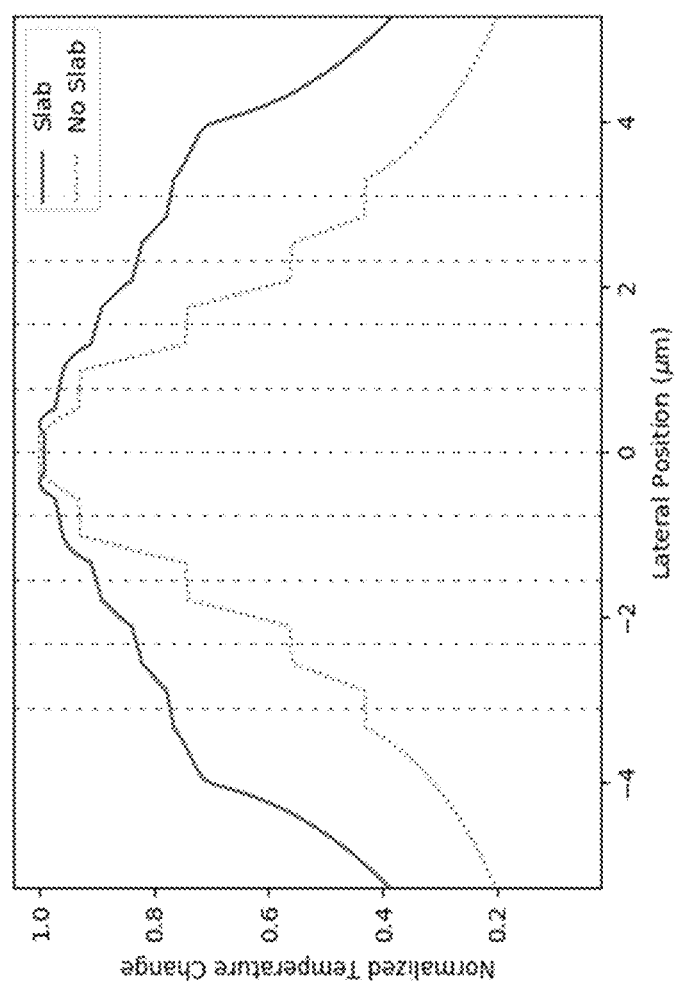
FIG. 4 is a graph that illustrates simulated thermal distribution and falloff in terms of normalized temperature change for unit current through the heater at the waveguide layer, for both the thermal phase shifter arrangements shown in FIG. 3B and FIG. 3D.

FIG. 4 is a graph that illustrates simulated thermal distribution and falloff in terms of normalized temperature change for unit current through the heater 312 and 352 at the waveguide layer, for both the thermal phase shifters 310 and 350 shown in FIG. 3B and FIG. 3D. More specifically, the thermal falloff is shown for an arrangement without the connecting waveguide slab 362 against the thermal falloff for an arrangement with the connecting waveguide slab 362 in order to show the difference made by connecting the waveguide sections 320, 322, 324, 326, and 328 with the waveguide slab 362.

The X-axis represents the lateral position or displacement relative to the center of the heating element 312 or 352. The scale spans from a position −5 micrometers, e.g. 5 micrometers left of the center of the heating element 312 or 352 to a position of 5 micrometers, e.g. 5 micrometers right of the center of the heating element 312 or 352, with a position of zero being directly under the center of the heating element 312 or 352. The Y-axis represents the normalized temperature change at the waveguide section, e.g. waveguide section 320, 322, 324, 326, and 328. Since the scale is normalized, it spans from zero to one. Thus, the graph illustrates the relative temperature change at the waveguide section, e.g. waveguide sections 320, 322, 324, 326, and 328, based on the lateral distance from the center of the heating element 312 or 352.

The simulation is done using 9 waveguides at 775 nm pitch, both with and without a 70 nm connecting waveguide slab. The vertical dashed lines in the graph indicate waveguide section center positions. It can be seen, by comparing the graph associated with the connecting waveguide slab to the graph without the connecting waveguide slab, that the waveguide slab reduces falloff and raises the relative temperatures of the waveguide sections that are positioned further from the center of the heating element.

Figure 5A:
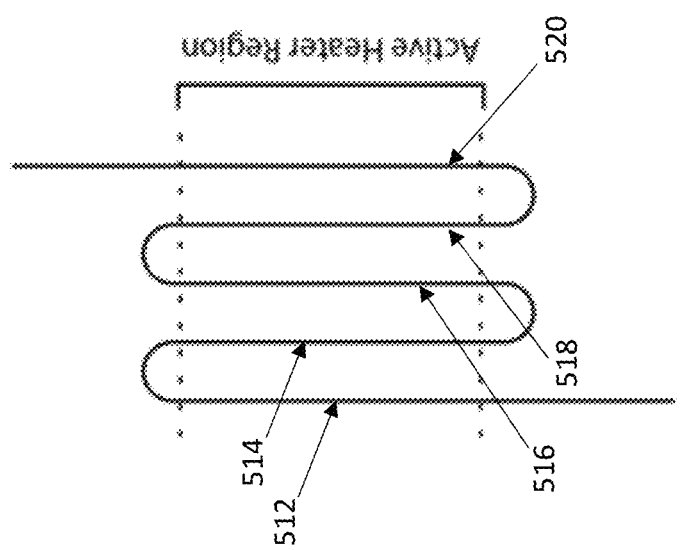
FIGS. 5A-5C are top views of example waveguide routing schemes, in accordance with embodiments of the present disclosure.
Figure 5B:
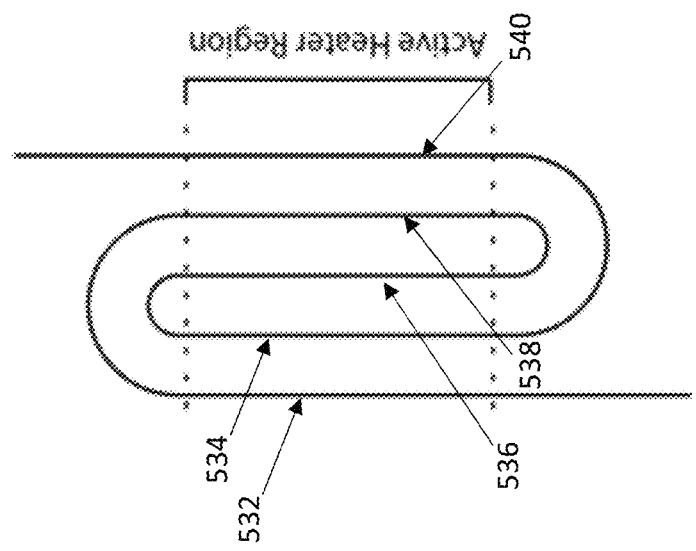
Figure 5C:
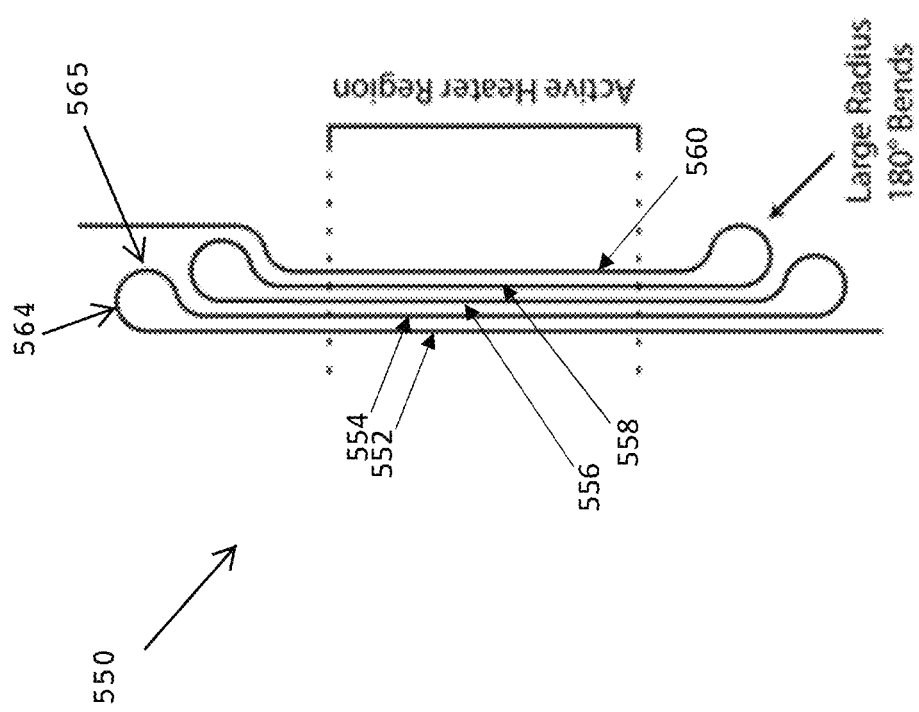

As previously discussed, there are numerous ways to route together the straight waveguide sections underneath the heating element. FIGS. 5A-5C are top views of example waveguide routing schemes for implementing the bend sections that route together the waveguides underneath the heating element.

FIG. 5A illustrates a simple serpentine routing scheme that connects five straight waveguide sections 512, 514, 516, 518, and 520. This routing scheme requires (N-1) bends for N passes through the heated section, with each bend section including a radius of curvature (or bend radius), e.g. half the waveguide pitch. However, routing the waveguide sections 512, 514, 516, 518, and 520 in such a tightly-packed serpentine structure requiring bend radii of half the waveguide pitch (below 400 nm) may cause problems, since silicon channel waveguides can typically only tolerate bend radii as small as 1 µm-2 µm without significant optical loss over the bend.

FIG. 5B illustrates a spiral-type routing scheme for connecting the five waveguide sections 532, 534, 536, 538, and 540, with some bends, e.g. the first and last outer bends having a larger radius, e.g. 1.5× the waveguide pitch or greater than 1 µm, and some bends, e.g. the second and third inner bends having a smaller radius, e.g. 0.5× the waveguide pitch or ⅓ the larger radius. In comparison to the routing scheme shown in FIG. 5A, the spiral-like routing presented in FIG. 5B increases the radius of some bends, but still requires a minimum radius of half the waveguide pitch. This is the arrangement for 5 passes/4 bends. More generally, for N bends, the first and last bend index may have the largest radius, the second and second last bends may have the next smaller radius, the third and the third last bends may have the next smaller, and so on, such that bend [i] and bend [N-i+1] have the same radii. Another way to conceptualize is to see FIG. 5B as a waveguide that has been "twisted" onto itself about the center heater.

Figure 5D:
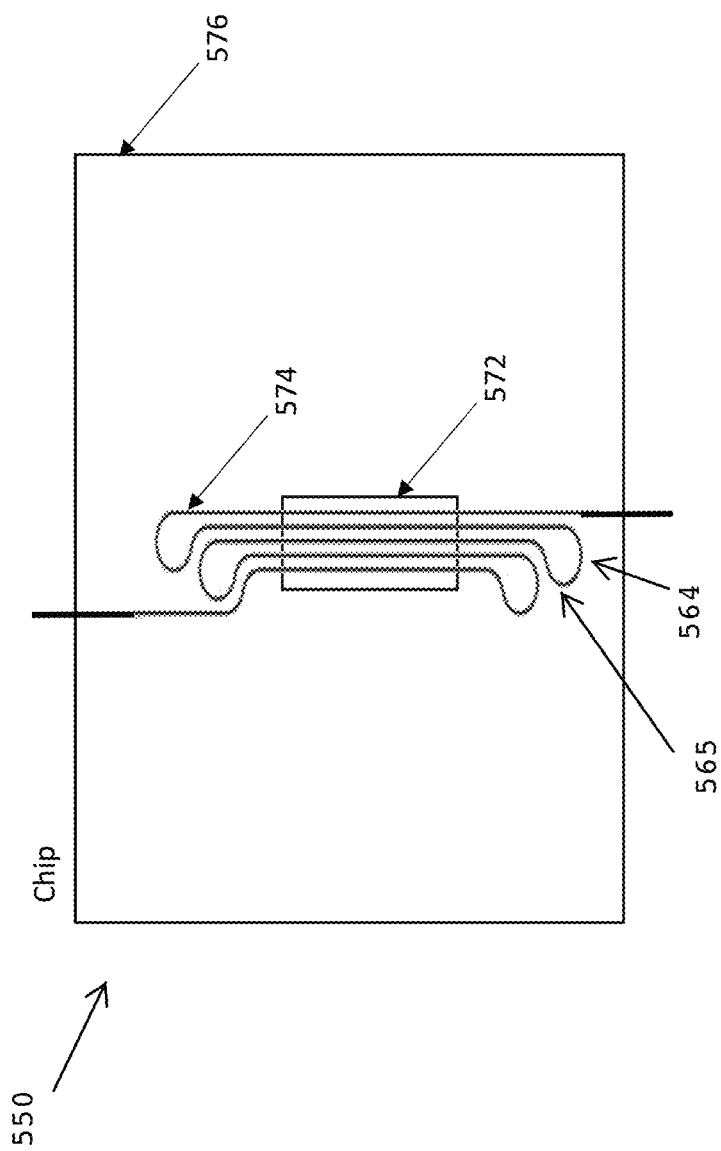
FIG. 5D illustrates a bend plus S-curve routing scheme shown in FIG. 5C integrated on a chip.

FIGS. 5C and 5D illustrate a phase shifter 550 including a waveguide 574, which includes a plurality of straight parallel waveguide sections, e.g. five waveguide sections 552, 554, 556, 558, and 560, with a bend section that enables a waveguide pitch in the active heater region far below the minimum bend radius, e.g. less than 800 nm, enabling the five waveguide sections 552, 554, 556, 558, and 560 to be placed tightly together. The bend sections may comprise a first bend traversing at least 180° followed by one or more second bends including portions bending in an opposite direction to the first bend. For example, each bend section may comprise a larger-radius, e.g. 180°, circular bend 564, e.g. bend radius greater than 1 µm, combined with an S-curve 565 to restore the narrow waveguide pitch, e.g. below 800 nm. The S-curve may comprise a concave portion extending from the 180° bend, and a concave portion extending between the concave portion and the next waveguide section. The bends sections may be nested, e.g. non adjacent each other due to the lengths of the waveguide sections 552, 554, 556, 558, and 560, being different, whereby portions of each of the 180° bends 564, may be disposed in a nested configuration, e.g. partially parallel, with portions of each of the adjacent S-curves 565, e.g. the concave portion, so the total width of the phase shifter 550 is not much larger than twice the bend radius, e.g. 2 µm, which is important to lower the total chip area consumed by the phase shifter 550. The bends 564 may include circular, semicircular, FIG. 5C, or elliptical, FIG. 5D, portions. In other words, the larger-radius 180° bends are used to route the long, straight parallel sections of the waveguide sections 552, 554, 556, 558, and 560 as closely together as possible. The combination of large-radius 180° bends 564 and S-curves 565 in this arrangement, when further combined with varying waveguide widths, enables the waveguide sections 552, 554, 556, 558, and 560 to be placed closer together than previously allowed for. FIG. 5D illustrates the bend plus S-curve routing scheme shown in FIG. 5C in the context of a chip, and a portion of the serpentine waveguide 574 running under a heating element 572 within a chip 576.

Another embodiment of the phase shifter 550 includes bends 564 comprising a local bend radius that changes gradually and smoothly, i.e. adiabatically, along the propagation length of the bend 564. This may be done in such a way so that the minimum local bend radius is never less than a predetermined chosen value $r_{min}$. A typical value for $r_{min}$ is 2 µm, so as to minimize radiative bend loss in the waveguide 574. Using this smoothly changing technique, the bend 564 may be extended in a concave bend over an angle (180+x) degrees, then continued in a convex bend over an angle (−x) degrees, such that the waveguide exiting the bend 564 is parallel to the one entering the bend 564 but offset by the waveguide to waveguide distance underneath the heater 572. The transition from concave to convex bend particularly depends on the smooth change of local bend radius to minimize optical loss. The local bend radius R as a function of propagation length L can follow a number of forms, e.g. linear (R∝mL) or hyperbolic tangent (R∝tan h(L)). Additionally, the section of waveguide before or after the large-radius bend is typically tapered in width from the width of the preceding waveguide to the width of the following waveguide, such that waveguide width is held constant within the bend 564. Conventional phase shifters rely strictly on a very small bend radii to pack waveguides densely under a heater, and since the waveguides all use the same cross sections there is a limit on how tightly the waveguides can be packed together. In other words, those waveguides suffer from the problem of large minimum bend radius and large minimum waveguide-to-waveguide spacing. In comparison, embodiments of the present disclosure, such as thermal phase shifters 550, do not have these problems because they allow for even tighter packing of the waveguides, e.g. less than 800 nm, preferably less than 700 nm, waveguide-to-waveguide pitch versus perhaps 2 um with most methods without requiring tight bends.

It should be noted that, for many practical applications of integrated photonics, especially for optical phased arrays, a large number of phase shifters must be densely packed on the chip. When multiple phase shifters are used, the phase shifters must be spaced far enough apart to prevent thermal crosstalk, where one heater will change the phase of light travelling through neighboring phase shifters because the lateral spread of heat warms those waveguides as well. If the phase shifters are arrayed in a straightforward one-dimensional array (array unit vector perpendicular to the light propagation direction), they must be separated by over nearly 15 µm to ensure less than 10% crosstalk. Conventional configurations are also very awkwardly shaped for large arrays, as a 1024-phase-shifter array would occupy a rectangle of approximately 500 µm×16 mm.

Figure 6B:
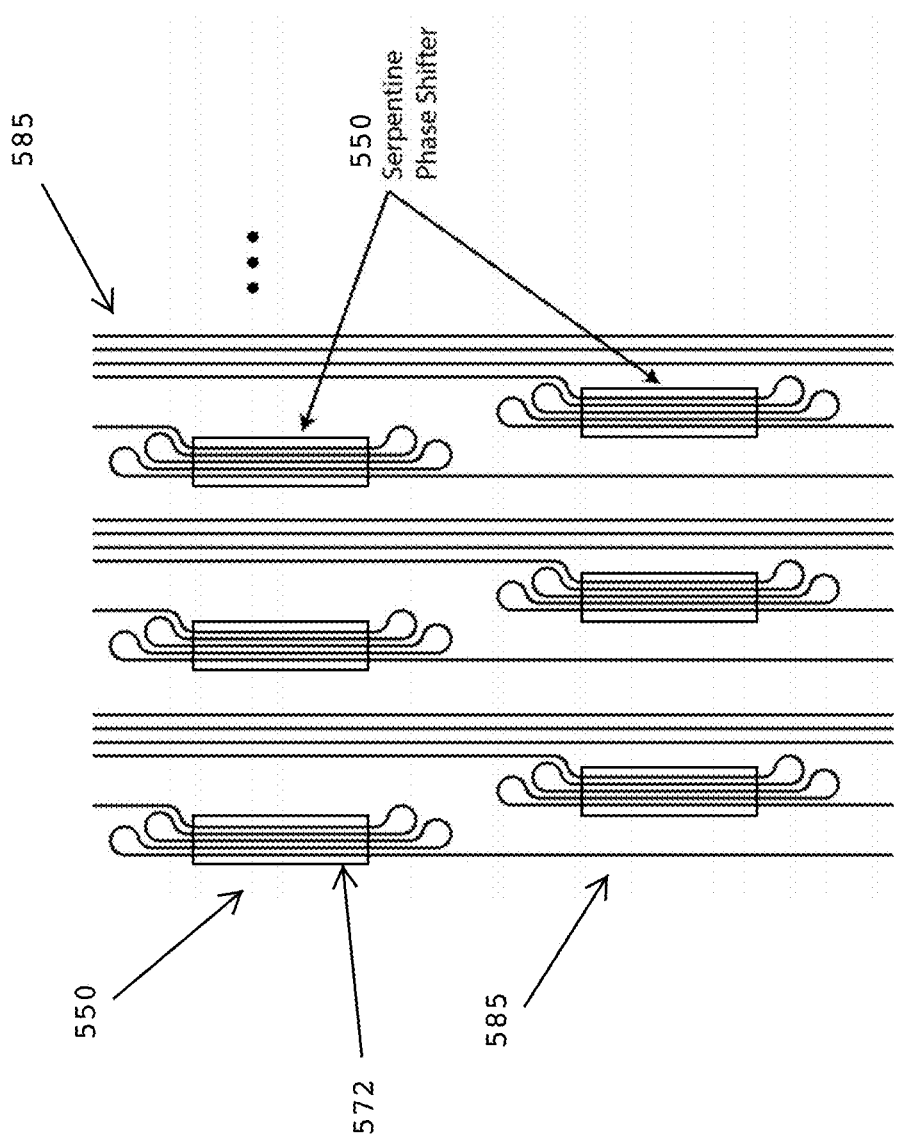
FIG. 6B shows the top view of the two-dimensional array layout of FIG. 6A.

With reference to FIGS. 6A and 6B, a plurality of phase shifters 550 may be stacked in multiple rows and columns (a 2-dimensional array), in a staggered configuration, e.g. adjacent phase shifters 550 in alternating rows and alternating columns, with routing waveguides 585 from deeper layers extending out between the other phase shifters 550. The plurality of rows of phase shifters 550 and plurality of columns of phase shifters 550 are in a staggered configuration with odd numbered columns, e.g. C1, C3 and C5, of phase shifters 550 staggered with even numbered columns, e.g. C2, C4 and C6, of phase shifters 550 with escape waveguides 585 from the even numbered columns of phase shifters 550 extending between the phase shifters 550 in the odd numbered columns of phase shifters 550. Since the serpentine phase shifters 550 make multiple passes through the heated zone of the chip but the escape waveguides 585 make only a single pass, the escape waveguides 585 effectively receive less thermal crosstalk than they otherwise would, given thermal decay alone. Thus, the escape waveguides 585 may be placed closer to other serpentine phase shifters 550 than the required distance between two serpentine phase shifters 550. In other words, the spacing between a serpentine phase shifter 550 and an escape waveguide 585 may be less than spacing between two serpentine phase shifters 550 because the escape waveguides 585 are less sensitive to temperature change and thermal crosstalk. The allowable spacing decreases by the multiplication in efficiency given by making multiple tight passes (up to nearly 5× for a five-pass phase shifter 550, for example). Routing some number of escape waveguides 585 between each phase shifter 550 therefore does not increase the area of the array. Accordingly, each escape waveguide 585 may be routed between neighboring phase shifters 550 disposed in front of and behind each row of phase shifters 550, whereby the escape waveguides 585 are disposed closer to one another than to the neighboring phase shifters 550.

It should be noted that all of these techniques work to increase efficiency regardless of the specific method used to heat the waveguides, e.g. waveguides 552, 554, 556, 558 and 560. For example, the heating elements 312, 352 or 572 may be positioned on top of or within the upper cladding 316. The heating element 312, 352 or 572 may be made of, for example, a metal, a metal alloy (like nichrome), a conductive metal nitride, or a silicide. Alternatively, the heaters 312, 352 or 572 could be formed by doping and passing current through the waveguide layer itself. In some embodiments, the waveguides, e.g. waveguides 552, 554, 556, 558 and 560, and the bends 564 may be connected by a slab, e.g. slab 562, and the slab-connected waveguides, e.g. waveguide 320, 322, 324, 326, and 328, themselves may operate as a heater by placing contacts left and right of the waveguides, optionally doping the waveguides, and running current laterally through the serpentine waveguides themselves. By generating heat directly where it is needed, this method improves both heater efficiency and response time.

Figure 7A:
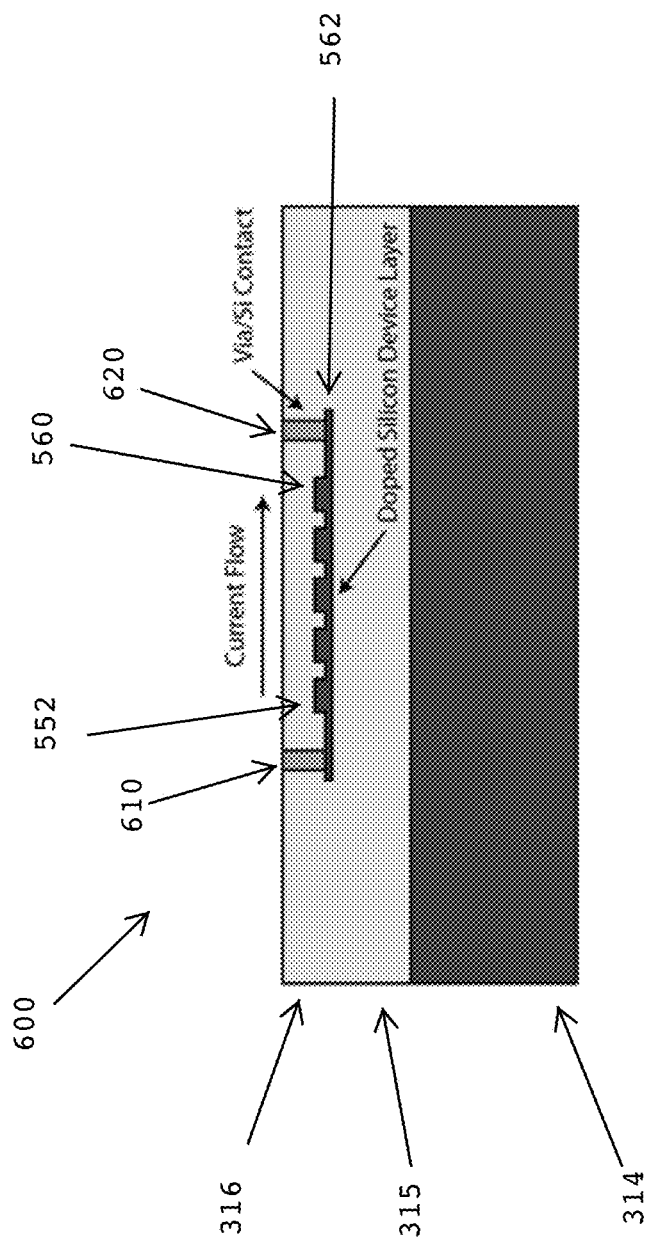
FIG. 7A is a vertical cross-sectional view of a doped silicon heater.
Figure 7B:
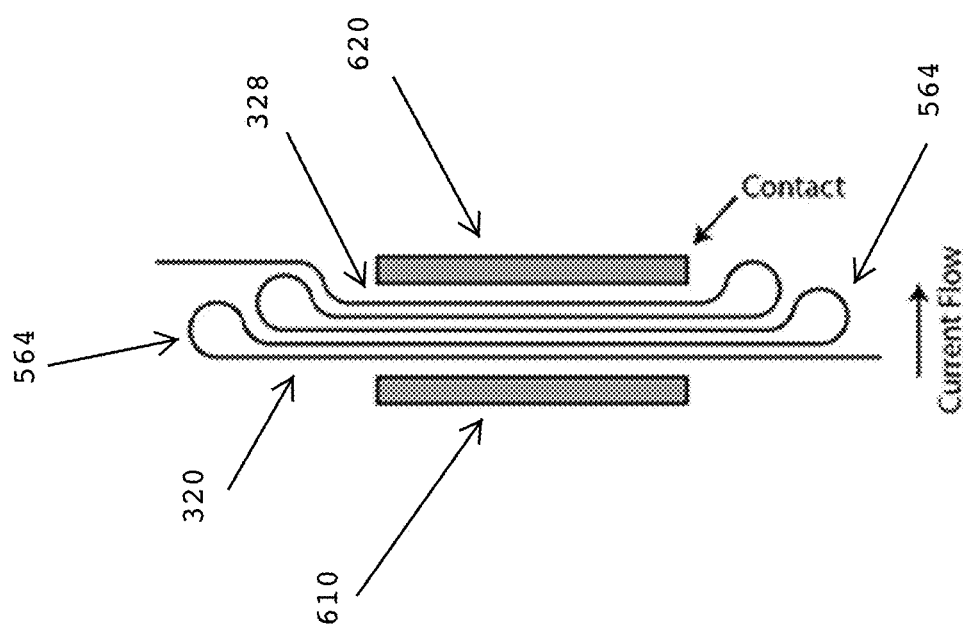
FIG. 7B is a top view of a waveguide arrangement for the doped silicon heater shown in FIG. 7A.

FIG. 7A illustrates a vertical cross-sectional view of a doped waveguide, e.g. silicon, heater 600. FIG. 7B is a top down view of the waveguide arrangement for the doped waveguide heater 600 shown in FIG. 7A. The waveguides, e.g. waveguides 552, 554, 556, 558 and 560, are connected by a slab, e.g. slab 562, and electrical contacts 610 and 620 are placed left and right sides of the multi-pass region to enable current to be flowed laterally through the waveguides, e.g. waveguides 552, 554, 556, 558 and 560. The waveguides, e.g. waveguides 552, 554, 556, 558 and 560, may be doped between the contacts 610 and 620 to set the total heater resistance and confine current flow.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A phase shifter comprising:
  a substrate;
  a cladding layer over the substrate;
  a waveguide within the cladding layer comprising a plurality of parallel waveguide sections adjacent each other, and a plurality of waveguide bend sections connecting the plurality of parallel waveguide sections; and
  a heater for generating heat for heating the waveguide, thereby changing an index of refraction of the waveguide, the heater comprising at least a portion of the parallel waveguide sections, the at least a portion of the parallel waveguide sections for generating at least a portion of said heat;
  wherein adjacent parallel waveguide sections each having a different propagation constant, to exhibit a wavevector mismatch between immediately adjacent straight parallel waveguide sections to attenuate coupling therebetween.

2. The phase shifter according to claim 1, wherein each of the plurality of parallel waveguide sections comprises a different width.

3. The phase shifter according to claim 1, wherein each of the plurality of straight parallel waveguide sections comprises a width of between 250 nm and 500 nm.

4. The phase shifter according to claim 1, wherein the plurality of straight parallel waveguide sections comprise a constant waveguide pitch of below 800 nm.

5. The phase shifter according to claim 4, wherein each of the plurality of bend sections comprise a radius of curvature of greater than 1µm.

6. The phase shifter according to claim 4, wherein each of the plurality of bend sections comprise a radius of curvature of greater than 2µm.

7. The phase shifter according to claim 1, wherein the plurality of parallel waveguide sections are connected by, and integral with, a slab waveguide of the waveguide.

8. The phase shifter according to claim 7, wherein the slab waveguide comprises an electrically-conductive waveguide material; and wherein the heater comprises a first contact connected to one side of the slab waveguide, and a second contact connected to another side of the slab waveguide, the first contact and second contact spaced apart in a direction substantially perpendicular to a direction of propagation of light through the waveguide.

9. The phase shifter according to claim 1, wherein the plurality of waveguide bend sections includes a first bend section and a last bend section including a larger bend radius, and a second bend section and a third bend section include a smaller bend radius.

10. The phase shifter according to claim 9, wherein the smaller bend radius is equal to half a waveguide pitch of the plurality of parallel waveguide sections, and the larger bend radius is at least 3 times larger than the smaller bend radius.

11. The phase shifter according to claim 1, wherein each of the plurality of waveguide bend sections comprises a first bend traversing at least 180° followed by a second bend including portions bending in an opposite direction to the first bend.

12. The phase shifter according to claim 11, wherein each first bend comprises a 180° circular bend and each second bend comprises an S-shaped bend.

13. The phase shifter according to claim 12, wherein each of the first bends and each of the second bends comprises a local bend radius that gradually changes; and wherein the local bend radius is never below a predetermined minimum value.

14. The phase shifter according to claim 11, wherein each of the plurality of parallel waveguide sections comprise a different length, whereby the plurality of waveguide bend sections are disposed in staggered, non-adjacent positions.

15. The phase shifter according to claim 14, wherein a portion of each of the first bends is parallel to a parallel portion of each of the second bends in adjacent waveguide bend sections.

16. The phase shifter according to claim 1, wherein the heater comprises a resistive heater mounted on or in the cladding layer above the waveguide.

17. The phase shifter according to claim 8, wherein at least one of the slab waveguide and the plurality of parallel waveguide sections is comprised of doped silicon.

18. An array of phase shifters comprising:
a plurality of rows of phase shifters and a plurality of columns of phase shifters, each phase shifter phase shifter comprising:
a substrate;
a cladding layer over the substrate;
a waveguide within the cladding layer comprising a plurality of parallel waveguide sections adjacent each other, and a plurality of waveguide bend sections connecting the plurality of parallel waveguide sections, and an escape waveguide section; and
a heater for heating the waveguide, thereby changing an index of refraction thereof;
wherein adjacent parallel waveguide sections each comprise a different width and thus a different propagation constant, to increase a wavevector mismatch between immediately adjacent parallel waveguide sections to decrease coupling therebetween; and
wherein each escape waveguide section are routed between neighboring phase shifters disposed in front of and behind each row of phase shifters, whereby the escape waveguides are disposed closer to one another than to the neighboring phase shifters.

19. A phase shifter comprising:
a substrate;
a cladding layer over the substrate;
a waveguide within the cladding layer comprising a plurality of parallel waveguide sections adjacent each other, and a plurality of waveguide bend sections connecting the plurality of parallel waveguide sections; and
a heater for generating heat for heating the waveguide, thereby changing an index of refraction of the waveguide, the heater comprising at least a portion of the parallel waveguide sections, the at least a portion of the parallel waveguide sections for generating at least a portion of said heat;
wherein each of the plurality of waveguide bend sections comprises a 180° circular bend and an S-shaped bend.

* * * * *